(12) United States Patent
Moore

(10) Patent No.: US 7,484,327 B2
(45) Date of Patent: Feb. 3, 2009

(54) FISHING LURE AND METHOD THEREFOR

(76) Inventor: Andre S. Moore, 14025 N. 80th Pl., Scottsdale, AZ (US) 85260

( * ) Notice: Subject to any disclaimer, the term of this patent is extended or adjusted under 35 U.S.C. 154(b) by 0 days.

(21) Appl. No.: 11/155,373

(22) Filed: Jun. 17, 2005

(65) Prior Publication Data

US 2006/0037231 A1    Feb. 23, 2006

Related U.S. Application Data

(63) Continuation-in-part of application No. 10/921,751, filed on Aug. 18, 2004, now abandoned.

(51) Int. Cl.
*A01K 85/00* (2006.01)
(52) U.S. Cl. ...................... 43/42.28
(58) Field of Classification Search ............. 43/42.1, 43/42.24, 42.28, 42.06, 42.26; D22/128
See application file for complete search history.

(56) References Cited

U.S. PATENT DOCUMENTS

| | | | | |
|---|---|---|---|---|
| 2,955,378 A * | 10/1960 | Burke | ........................ | 43/42.28 |
| D222,058 S * | 9/1971 | Meadors | ...................... | D22/27 |
| 3,983,656 A * | 10/1976 | Bain | .......................... | 43/42.24 |
| 3,992,800 A * | 11/1976 | Neil | ........................... | 43/42.24 |
| 4,069,610 A * | 1/1978 | Firmin | ...................... | 43/42.24 |
| 4,530,179 A * | 7/1985 | Larew | ........................ | 43/42.06 |
| 4,592,161 A * | 6/1986 | Smith et al. | ................ | 43/42.24 |
| 4,709,501 A * | 12/1987 | Garst | ........................ | 43/42.24 |
| 4,827,657 A * | 5/1989 | Slehofer | ..................... | 43/44.2 |
| 4,831,770 A * | 5/1989 | Dworski | .................... | 43/42.24 |
| 4,914,850 A * | 4/1990 | Rice | ............................ | 43/42.24 |
| 5,133,148 A * | 7/1992 | Lawson | ..................... | 43/42.27 |
| 5,408,780 A * | 4/1995 | Chambers, Sr. | ............ | 43/42.53 |
| 6,082,038 A * | 7/2000 | Link | .......................... | 43/42.24 |
| 6,094,855 A * | 8/2000 | Stump | ........................ | 43/42.24 |
| 6,173,523 B1 * | 1/2001 | Johnson | ..................... | 43/42.24 |
| 6,634,135 B1 * | 10/2003 | Rydell | ......................... | 43/42.1 |
| 2002/0170225 A1 * | 11/2002 | Gibbs et al. | ................ | 43/42.28 |

* cited by examiner

*Primary Examiner*—Kurt Rowan
(74) *Attorney, Agent, or Firm*—Kenneth M. Bush; Bush Intellectual Property Law

(57) ABSTRACT

An artificial fishing lure has an oval shaped cylindrical body section. A plurality of rib members are formed around the outer perimeter of the body section. The plurality of rib members are for preventing the fishing lure from slipping out of a mouth of a fish. A tail section extends from an end of the body section. The tail section is split horizontally down the center of the tail section to allow each half of the tail section to separate and then come back together in a pinching motion when the fishing lure is pulled through the water.

1 Claim, 2 Drawing Sheets

FISHING LURE AND METHOD THEREFOR

RELATED APPLICATION SECTION

This application is a continuation in part of U.S. patent application having Ser. No. 10/921,751, entitled "Fishing Lure and Method Therefor", invented by Andre S. Moore, and filed Aug. 18, 2004 now abandoned.

BACKGROUND OF THE INVENTION

1. Field of the Invention

This invention relates to fishing equipment and, more specifically, to an improved fishing lure.

2. Description of the Prior Art

The sport fishing industry has become a huge business. According to reports, the sport fishing industry is over a $28 billion business. Anglers are constantly searching for technological advances and advantages to catch fish and to compete in catching fish against other anglers. Examples of such technological advances include scent-impregnated lures and high-tech fish finders, which tend to increase the effectiveness of the angler.

There are several different categories of fishing lures on the market. They include, but are not limited to, crankbaits, spinnerbaits, soft-plastic lures, jigs, topwaters, and spoons. Crankbaits are formed as a hard plastic diving lure. Spinnerbaits are lures that include spinning blade(s) to provide slight undulations of the lure that mimic a small fish swimming. Soft-plastics lures typically take the form of rubber worms, lizards, etc. Jigs take the form of heavy lures that extend vertically from the fishing line in the water. Topwaters are lures that float on the surface of the water. In general, most anglers have several lures from each of these categories in their tackle box, wherein each lure may be preferred for specific fishing situations or for a particular type of fish.

As stated above, soft-plastics lures typically take the form of rubber worms, lizards, etc. There are several problems with current soft plastic lures. First, when trying to set the hook to catch the fish, many times, the soft-plastic lure will slip out of the mouth of the fish. This is due to the fact that most current soft-plastic lures are too flexible and slick. Another problem with current soft-plastic lures are that the lures don't move in a realistic manner. When an angler is pulling the lure through the water, the movement of most soft plastic lures do not imitate authentic water life.

Therefore, a need existed to provide an improved fishing lure. The improved fishing lure must overcome the problems associated with prior art fishing lures. The improved fishing lure must be better able to set the hook in the fish. The improved fishing lure must also move in a more realistic manner.

SUMMARY OF THE INVENTION

In accordance with one embodiment of the present invention, it is an object of the present invention to provide an improved fishing lure.

It is another object of the present invention to provide an improved fishing lure that overcomes the problems associated with prior art fishing lures.

It is another object of the present invention to provide an improved fishing lure that is better able to set the hook in the fish.

It is another object of the present invention to provide an improved fishing lure that moves in a more realistic manner.

BRIEF DESCRIPTION OF THE EMBODIMENTS

In accordance with one embodiment of the present invention an artificial fishing lure is disclosed. The artificial fishing lure has an oval shaped cylindrical body section. A plurality of rib members are formed around the outer perimeter of the body section. The plurality of rib members are for preventing the fishing lure from slipping out of a mouth of a fish. A tail section extends from an end of the body section. The tail section is split horizontally down the center of the tail section to allow each half of the tail section to separate and then come back together in a pinching motion when the fishing lure is pulled through the water.

In accordance with another embodiment of the present invention an artificial fishing lure is disclosed. The artificial fishing lure has an oval shaped cylindrical body section. A plurality of rib members are formed around the outer perimeter of the body section. The rib members are semi-rigid to prevent the fishing lure from slipping out of a mouth of a fish. A tail section extends from an end of the body section. The tail section is split horizontally down the center of the tail section to allow each half of the tail section to separate and then come back together in a pinching motion when the fishing lure is pulled through the water. The tail section is oval in shape and has a rough top and bottom surface. A pair of side wing members is provided. A single side wing member is coupled on each side of the body member. The side wing members move in a flapping motion when the fishing lure is pulled through the water. The body section of the fishing lure has a slight indentation which runs the majority of the length of the body section. The plurality of ribs members are formed on each half of the body section.

The foregoing and other objects, features, and advantages of the invention will be apparent from the following, more particular, descriptions of the preferred embodiments of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunction with the accompanying drawings.

DETAILED DESCRIPTION OF THE PREFERRED EMBODIMENT

Figure 1:
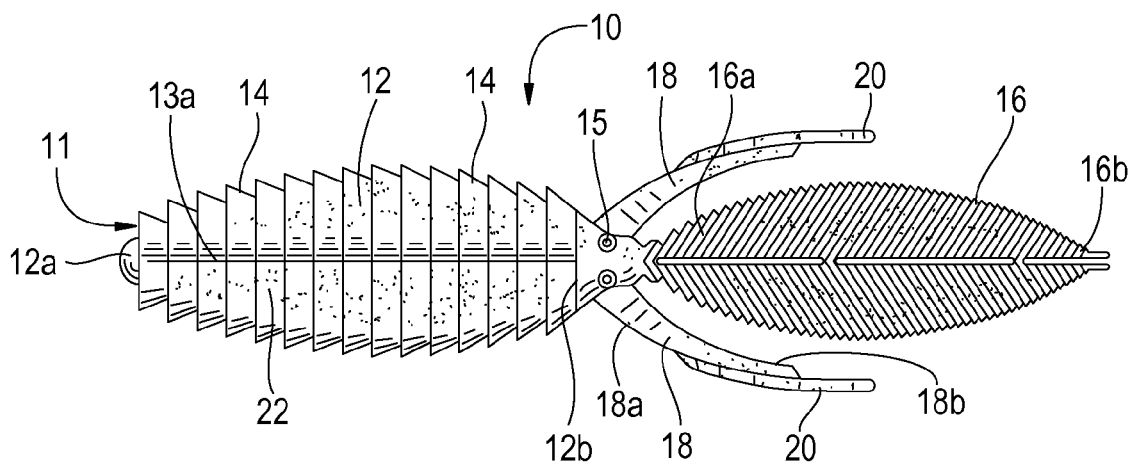
FIG. 1 is an elevated top view of the fishing lure of the present invention.
Figure 2:
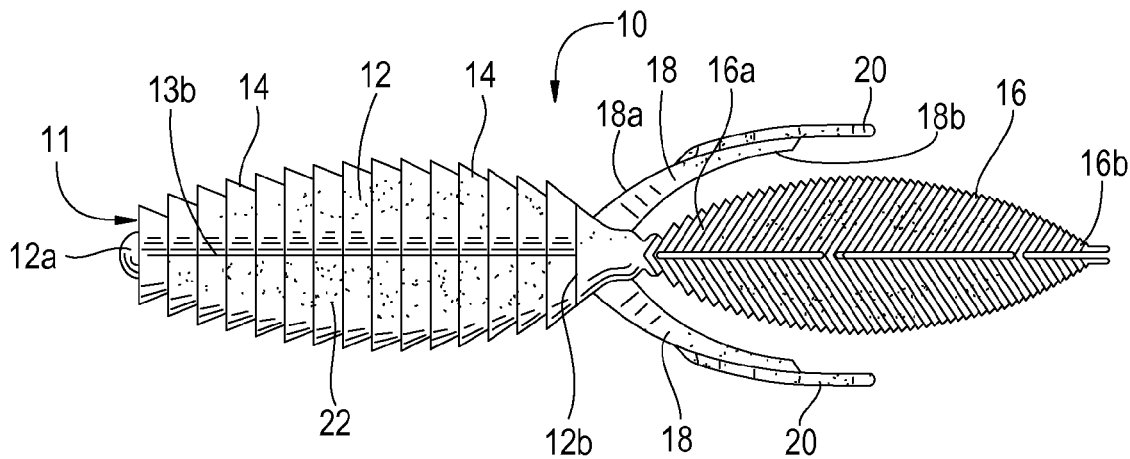
FIG. 2 is a bottom view of the fishing lure of the present invention.
Figure 3:
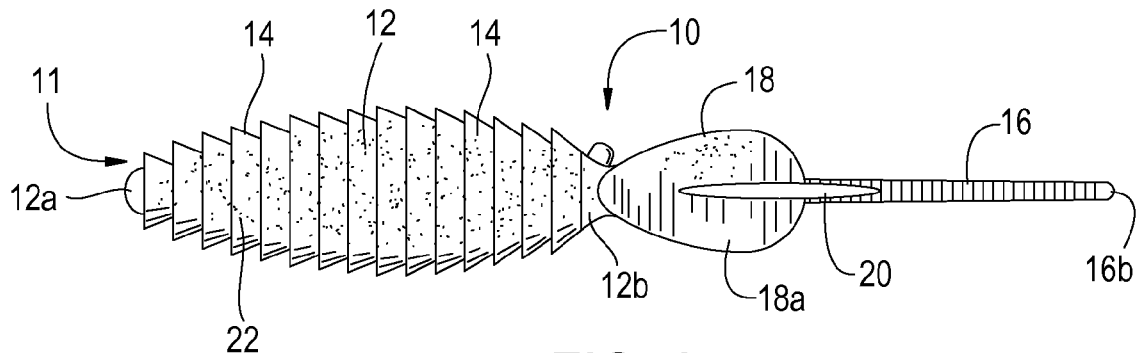
FIG. 3 is a side view of the fishing lure of the present invention.
Figure 4:
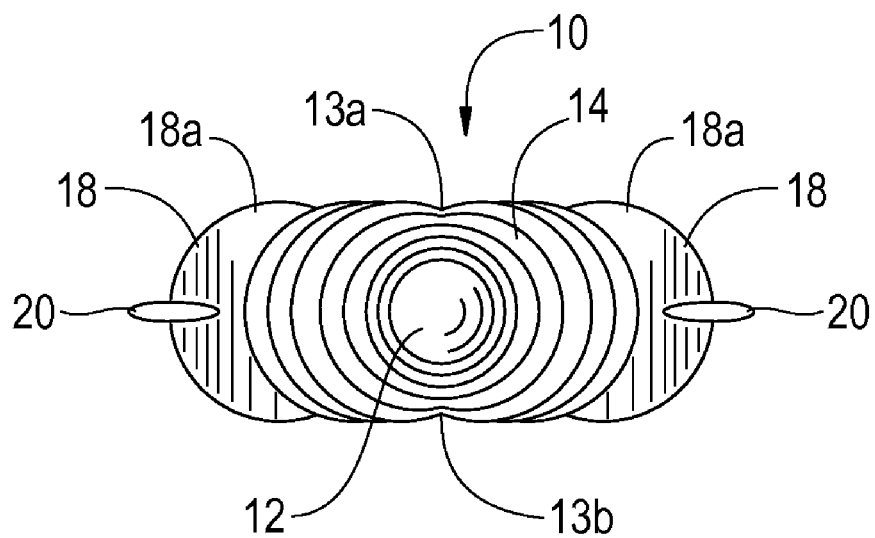
FIG. 4 is a front view of the fishing lure of the present invention.
Figure 5:
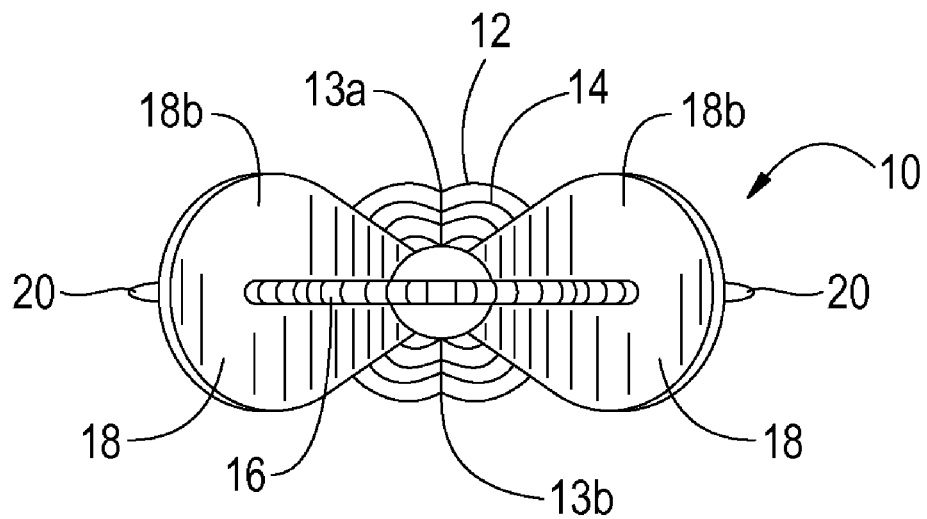
FIG. 5 is a rear view of the fishing lure of the present invention.

Referring to the Figures, an improved fishing lure 10 (hereinafter fishing lure 10) is shown. The fishing lure 10 overcomes the problems associated with the prior art. The fishing lure 10 is better able to set the hook in the fish and also moves in a more realistic manner.

The fishing lure 10 is a one piece fishing lure made of a soft rubber material which is resilient and flexible. One example of such a material is a thermoplastic plastisol resin. Plastisol resin is a solution of powdered polyvinyl chloride (PVC) and plasticizer. The process requires a metal mold capable of withstanding the 300 to 400 degree F. molding temperatures and liquid plastisol. The mold is preheated to 350 degrees F. and filled with plastisol. The excess plastisol is poured out of the mold. The coating on the surface remains. The thickness of the coating is determined by the amount of time the mold stays in contact with the liquid plastisol. The mold is then reheated to 350 degrees F. The reheating fuses the PVC particles together and forces off any excess plasticizer converting the remaining plastisol into a homogenous mass.

The soft rubber material may further be colored. Thus, the fishing lure 10 can be made in a variety of colors. In general, the top surface of the fishing lure 10 is slightly darker than the bottom surface of the fishing lure 10.

The fishing lure 10 will have an oval cylindrical body section 12. The body section 12 will have a proximal end 12a, a distal end 12b, and a plurality of ribs 14. In accordance with one embodiment of the present invention, both the top and bottom surfaces of body section 12 have slight indentations 13a and 13b which run the majority of the length of the body section 12 down a central area thereof. The indentations 13a and 13b run from proximate front end section 11 of fishing lure 10 to proximate the point at which the tail section 16 is coupled to the body section 12. The indentations 13a and 13b form a convenient location for an angler to place a hook, as it is the thinnest portion of the body section 12. For example, a method of rigging the lure called a 'Texas Rig' that requires that the hook be pushed through the lure and then the tip of the hook re-inserted into the lure will be greatly facilitated by the indentations 13a and 13b formed along the body section 12. Also, as the indentations 13a and 13b run along the center of the lure, a hook placed in the indentations 13a and 13b will not upset the balance of the lure and will allow it to run through water without spinning or twisting. Finally, as the indentations 13a and 13b are recessed below the level of the surrounding ribs 14 it acts to protect the hook from snags the bait will encounter underwater. A set of ribs 14 will be formed on each half of the body section 12. The ribs 14 are semi-rigid and angled towards the front end section 11 of the fishing lure 10 and away from the tail section 16. The angle facilitates the fish taking the lure in its mouth because the semi-rigid rib members 14 can compress as the fish strikes creating very little resistance. When the fish closes its mouth and exerts pressure upon the ribs 14, the ribs 14 will come into contact with and catch upon surfaces in the mouth of a fish. Because the ribs 14 are angled towards the mouth of a fish, the ribs 14 will expand as the angler pulls on the line and will act as a barb securing the fishing lure 10 in the mouth of the fish. Another benefit of the shape of the ribs 14 is that the ribs act as a form of parachute slowing fishing lure 10's rate of descent. This is important for an angler who wants a heavy fishing lure while at the same time one that does not sink quickly in water.

The fishing lure 10 may be impregnated with salt. Because fish like the taste of salt they will tend to hold a salted lure tighter than one that is unsalted. Accordingly, the semi-rigid ribs 14 are beneficial as they are more efficient at releasing salt than a less rigid salted lure. This is because, as the fish clamps down on the fishing lure 10 and the angler puts pressure on the line, the semi-rigid ribs 14 act as a barb against the surfaces of the mouth of the fish and this causes the semi-rigid ribs 14 to flex. The flexing action forces salt out of the tips of the semi-rigid ribs 14. This is an efficient method of dispensing salt because the salt tends to accumulate in the tips of the semi-rigid ribs 14. Additionally, as the semi-rigid ribs 14 are angled towards front end section 11 of fishing lure 10, when they do act as a barb, they will be forced to flex and stretch more than a standard straight rib. The additional flexing and stretching results in a greater amount of salt being forced out of the lure 10 and into the mouth of the fish. As the semi-rigid ribs 14 release more salt, the fish will tend to hold the fishing lure 10 more tightly, thus helping the angler to hook the fish.

A pair of eyes 15 is formed on the body section 12. The eyes 15 are positioned on the back end of the body section 12. The eyes 15 are slight raised above the surface of the body section 12. The raised eyes 15 provide a more lifelike appearance for the fishing lure 10.

Coupled to the body section 12 is a substantially horizontal tail section 16 having a proximal end 16a and a distal end 16b. The tail section 16 is fairly flat and oval in shape. The top and bottom sides of the tail section 16 have a rough surface. The rough surface will also provide friction to prevent the fishing lure 10 from slipping out of the mouth of the fish when one is trying to set the hook.

The tail section 16 is split horizontally down the center of the tail section 16. The split in the tail section 16 allows each half of the tail section 16 to separate then come back together in a pinching motion when the fishing lure 10 is pulled through the water. The pinching motion provides a more realistic and life like movement. Thus, the fishing lure 10 will appear more realistic and life like to a fish.

The fishing lure 10 also has a pair of substantially vertical side wings 18 having an external surface 18a and an internal surface 18b. The side wings 18 are positioned on each side of the body member 12. The side wings 18 are teardrop in shape. The side wings 18 have a strip 20 which extends from the side wing 18. When the fishing lure 10 is pulled through the water, the side wing 18 moves in a flapping motion. The flapping motion allows the fishing lure 10 to appear more life like and realistic.

Together, tail section 16 and side wings 18 form a unit with components that can move in both horizontal and vertical directions. As a result, a fish viewing the lure 10 from any angle will see parts of the lure move in a lifelike manner.

The fishing lure 10 may be made having light reflecting items 22 such as glitter or other shiny material added to the fishing lure 10. The light reflecting items 22 may be added to the soft rubber material when the fishing lure 10 is made. Thus, the light reflecting items 22 will be formed inside the fishing lure 10. This will prevent the light reflecting items 22 from flaking off of the fishing lure 10. The light reflecting items 22 will help to reflect light when the fishing lure 10 is being used. The reflecting light is used to attract fish.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An artificial fishing lure, comprising:

an oval-shaped body comprising a proximal end, a distal end, a top surface, a bottom surface, and a plurality of semi-rigid ribs circumscribing said body, wherein said top and bottom surfaces of said body each have a slight indentation that extends a portion of the length of said body along a central area thereof, wherein said ribs are angled towards said proximal end of said body so that when a fish bites down on said body said ribs will engage the fish's mouth to prevent the lure from being expelled from the fish's mouth, and wherein said ribs are impregnated with salt so that when the fish bites down on said body said ribs are flexed to expel salt into the fish's mouth thereby inducing the fish to hold the lure in its mouth;

a thin, substantially horizontal, oval-shaped tail comprising a proximal end, a distal end, a top surface, and a bottom surface, wherein said proximal end of said tail is attached to said distal end of said body and said top and bottom surfaces of said tail are rough to engage the fish's mouth to prevent the lure from being expelled from the fish's mouth;

opposing thin, substantially vertical, teardrop-shaped wings, each wing comprising a proximal end, a distal end, an external surface, and an internal surface, wherein said proximal end of each said wing is attached to said distal end of said body; and an elongated member attached to said external surface of each said wing and extending in a substantially horizontal direction therefrom, wherein each elongated member comprises a proximal end attached to said external surface and a distal end extending distally of said distal end of said wing.

* * * * *